(12) United States Patent
Ferreira et al.

(10) Patent No.: US 12,524,456 B2
(45) Date of Patent: Jan. 13, 2026

(54) LOGIC RULE-BASED RELATIVE SUPPORT AND CONFIDENCE FOR SEMI-STRUCTURED DOCUMENT CONTENT EXTRACTION

(71) Applicant: Dell Products L.P., Round Rock, TX (US)

(72) Inventors: Paulo Abelha Ferreira, Rio de Janeiro (BR); Pablo Nascimento da Silva, Niteroi (BR); Rômulo Teixeira de Abreu Pinho, Niteroi (BR); Vinicius Michel Gottin, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 849 days.

(21) Appl. No.: 17/661,956

(22) Filed: May 4, 2022

(65) Prior Publication Data

US 2023/0359661 A1 Nov. 9, 2023

(51) Int. Cl.
| | |
|---|---|
| *G06F 16/383* | (2019.01) |
| *G06F 16/34* | (2019.01) |
| *G06F 40/117* | (2020.01) |
| *G06F 40/16* | (2020.01) |
| *G06N 20/00* | (2019.01) |

(52) U.S. Cl.
CPC ......... *G06F 16/383* (2019.01); *G06F 16/345* (2019.01); *G06F 40/117* (2020.01); *G06F 40/16* (2020.01); *G06N 20/00* (2019.01)

(58) Field of Classification Search
CPC .... G06F 16/383; G06F 16/345; G06F 40/117; G06F 40/16; G06F 16/86; G06N 20/00; G06N 3/04; G06N 3/09

USPC .......................................................... 715/212
See application file for complete search history.

(56) References Cited

U.S. PATENT DOCUMENTS

| 11,847,175 B2 | 12/2023 | Ferreira et al. |
| 11,893,817 B2 | 2/2024 | Abelha Ferreira et al. |
| 2018/0203836 A1* | 7/2018 | Singh ................. G06F 40/18 |

(Continued)

OTHER PUBLICATIONS

Cheung et al. (CUSTODES: Automatic Spreadsheet Cell Clustering and Smell Detection using Strong and Weak Features), published May 2016, pp. 464-475. (Year: 2016).*

*Primary Examiner* — Mohammed H Zuberi
*Assistant Examiner* — Ahamed I Nazar
(74) *Attorney, Agent, or Firm* — Workman Nydegger

(57) ABSTRACT

One method includes extracting word-elements, each corresponding to a respective element of a ground truth cell-item array from an annotated document, applying logic rules to the extracted word-elements so that the applicability, or not, of each logic rule to each element of the ground truth cell-item array is determined. Based on the applying of the logic rules, metrics are obtained that indicate, for each word-element of the annotated document, the applicability of the logic rules, and the frequency with which applicable logic rules is satisfied. A first aggregation process is performed that aggregates the metrics across a group of unstructured, and annotated, documents, and a second aggregation process is performed that aggregates the metrics regarding a model-generated cell item array that was created based on the group of annotated documents. Finally, respective outcomes of the first and second aggregation processes are compared so as to identify logic rules of interest.

20 Claims, 11 Drawing Sheets

(56) References Cited

U.S. PATENT DOCUMENTS

| | | | |
|---|---|---|---|
| 2021/0342785 A1* | 11/2021 | Mann | G06F 3/0484 |
| 2023/0031202 A1* | 2/2023 | Abelha Ferreira | G06V 30/412 |
| 2023/0229537 A1* | 7/2023 | Harutyunyan | G06F 11/079 |
| | | | 714/26 |
| 2023/0237080 A1 | 7/2023 | Pinho et al. | |
| 2023/0237272 A1 | 7/2023 | Teixeira De Abreu Pinho et al. | |

* cited by examiner

```
% words that are product names are associated to a same column as the 'Item description' header
rule(assert_product_description(W)).
description(assert_product_description(W),
            "Product name $W should be associated to the Item Description header.").
precond(assert_product_description(W),
        product_name(W) ).
check(assert_product_description(W),
      ( header_column('Item Description', C), column(W,C) ).

% words whose column relates to a 'Price' header can be interrupted as a numerical value
rule(assert_col_numeric(W,'Price')).
description(assert_col_numeric(W,T),
            "Word $W related to a $T header should be interpretable as a numerical value.").
precond(assert_col_numeric(W,T),
        ( column(W,C), header_column(T, C) ) ).
check(assert_col_numeric(W,T),
      ( numeric_transf(W,Wn), contains_numeric(Wn) ) ).

% a word that is below single-word cells should be a single word in a cell
rule(assert_single_word_col_above(W,T)).
description(assert_single_word_col_above(W,T),
            "Word $W is below single-word cells but is not alone in cell.").
precond(assert_single_word_col_above(W,T),
        ( column(W,C), row(W,R),  column(A,C), row(A,Q), Q<R,
          ( assert_single_word_col_above(A,T); header_word(A,T) )
        ).
check(assert_single_word_col_above(A,T),
      ( not(column(X,C), row(X,R), X=W) ).
```

FIG. 6

LOGIC RULE-BASED RELATIVE SUPPORT AND CONFIDENCE FOR SEMI-STRUCTURED DOCUMENT CONTENT EXTRACTION

FIELD OF THE INVENTION

Embodiments of the present invention generally relate to extraction of content from documents. More particularly, at least some embodiments of the invention relate to systems, hardware, software, computer-readable media, and methods for leveraging an existing attribution of cell-item indexes to word-elements in a document and a set of domain-dependent logic rules to guide human annotation processes in the extraction of content from unstructured documents.

BACKGROUND

The complexity of the content extraction domain may make it difficult to obtain universally generalizable automated solutions. Previous research work showed that it is possible to reach reasonable precision and recall for most fields. However, in practice, machine learning models still consistently require some feedback and review from human annotators to guarantee correctness of results. Thus, an approach to help identify such cases and to target the attention of human annotators, promoting their efficiency for the content-extraction task supported by machine learning (ML) models, is desirable.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 6 discloses an example implementation of logic rules as Prolog clauses.

DETAILED DESCRIPTION OF SOME EXAMPLE EMBODIMENTS

Figures 1, 2:
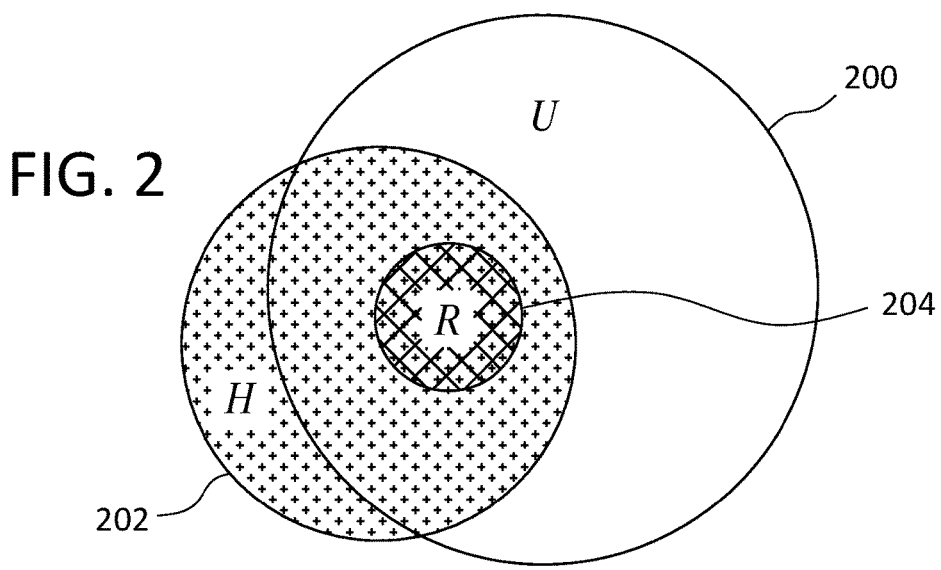
FIG. 1 discloses an example of an unstructured document (purchase order) with its content and, particularly, a target table for extraction of line-items—the expected assignment of row and column items are highlighted.
FIG. 2 discloses a representation of a set of universal rules that guide the domain.

Embodiments of the present invention generally relate to extraction of content from documents. More particularly, at least some embodiments of the invention relate to systems, hardware, software, computer-readable media, and methods for leveraging an existing attribution of cell-item indexes to word-elements in a document and a set of domain-dependent logic rules to guide human annotation processes in the extraction of content from unstructured documents.

In general, example embodiments of the invention may operate to leverage the partial structure provided by document layout information to determine a logic rule-based approach that may be used in conjunction, in a hybrid approach, with a machine learning model in order to support human decision-making, that is, the annotation, by a human, of information in, and/or extracted from, a document, such as a purchase order (PO) for example. In more detail, example embodiments may implement a logic rule-based method for identifying cases for which a machine learning model may have inferred incoherent, that is, with respect to expected layout patterns expressed as logic rules, cell-item indexes for word-items in documents. The results of the logic rule-based approach according to example embodiments may highlight some cases so as to minimize the required human intervention of the field extraction approach.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect (s) or solution(s). Finally, it is not required that any embodiment implement any of the advantageous and unexpected effects disclosed herein.

In particular, an embodiment may enable, and implement, the semi-automated labeling of documents by identifying interpretable points of concern to human annotators. An embodiment may reduce the amount of work needed to be performed by a human in content extraction processes. Various other advantages of example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Overview

A.1 Context

Example embodiments relate to extracting information from unstructured documents. Digital transformation and AI (artificial intelligence) can greatly contribute to the area of data management. One important aspect of data management is document data management, where automatic digital processing can greatly improve efficiency and compliance. Many big players are already developing AI methods for data management when processing internal and customers documents.

Information extraction from documents can improve data management techniques by allowing for automatic methods to understand, sort, and process, documents from different customers and documents pertaining to the internal processes of an enterprise. Thus, an enterprise may benefit greatly from having an automatic, and low-cost, method for obtaining this information to classify or extract content for process automation, compliance purposes, or other processes and purposes, of internal and customer document data.

There are instances where there may be an interest in extracting information from unstructured documents with intrinsic layout information, where examples of unstructured documents include scanned documents, and text-based PDFs (portable document format). Note that while an unstructured document may visually display information in a tabular form, for example, there is no structure intrinsic in the document itself, such as there might be in a structured document such as a spreadsheet for example, that indicates, for example, where a column or row starts/ends, which row constitutes a header, and what information of the document belongs in a particular column or row. Rather, these determinations must be made based on the visual appearance of the unstructured document.

Depending upon the circumstances, there may be specific information which a user would like to extract from the documents. Some embodiments of the invention may be particularly well suited, as an example domain use-case, in information from Purchase Orders (PO) made by the customers of an enterprise. To illustrate, when a customer wants to buy products from the enterprise, a PO document may be sent with all information regarding the list of products the customer wants to buy, the delivering address, contact information, quote number, and other details. Then this document is read by an employee, who manually checks to determine if all the information is correct, which is time-consuming. Thus, example embodiments of the invention are directed to methods to automatically identify and extract a set of fields from unstructured documents to extract and/or understand and classify relevant parts of the content of those unstructured documents.

A.2 Other Approaches

Table extraction in unstructured documents, for instance, is a hard research problem, that may involve pre-processing steps, computer vision and NLP (natural language processing). Most conventional approaches depend on strong assumptions on word features, pre-processing and post-processing.

Further, information extraction from documents is still an open research problem, with an active community, and major companies that may have tools do not make them (locally) available for application. Presently, no tools are known to exist that are able to learn, as example embodiments may, new template-based representations for positional field extraction automatically over time.

Problems related to those addressed in this disclosure have been taken up in U.S. patent application Ser. 17/649, 136, entitled "PREDICTION OF TABLE COLUMN ITEMS IN UNSTRUCTURED DOCUMENTS USING A HYBRID MODEL," filed Feb. 3, 2022 ("the '136 Application"), and incorporated herein in its entirety by this reference.

With reference now to FIG. 1, there is disclosed an example of an unstructured document 100, a purchase order in this illustrative case, with its content and, particularly, a table 102 from which line-items may need to be extracted. An expected assignment of row and column items are highlighted.

Particularly, FIG. 1 discloses an example of an unstructured document 100 with line-items to be extracted, namely, rows of the table 102, in this example. Note that it cannot be assumed that there is any fixed spatial alignment between table 102 elements, such as between row content and header words. In fact, there may be missing elements, such as a product description for the same product (see, e.g., 'Row 3' of 'Col=1'). Further, there might be elements which are not of interest for the purposes of information extraction, such as the 'Total' and the 'VAT. As a final example, header words may align differently among themselves, for example, the 'Product Description' header occupying two lines. These are all examples of the difficulties involved in extracting information with any pure rule-based, or rigid script, method applied to documents. Note that such problems are presented by way of example, and various other problems exist as well. Further, there are also issues with inconsistencies in the formatting, sorting, and graphical representation, of elements in the table 102.

An ultimate goal may be to automate the extraction of content. However, layout variability makes automation challenging and often requires very specialized and sophisticated systems for, by way of example, field information extraction. In effect, despite the existing of commercial solutions addressing information extraction from documents, the problem remains open and is one of the main subjects in state-of-the-art research in the intersections between computer vision and natural language processing.

Example embodiments may assume that appropriate approaches for extracting row-items and column-items from unstructured documents via supervised machine learning algorithms are utilized and that a model, or an ensemble of models, to determine cell-items is available. A cell-item may be determined, for example, as the tuple (r, c) where 'r' determines the index of the row, and 'c' determines the index of the column. The row 0 is semantically expected, possibly in most cases, to correspond to a header. For example, in FIG. 1 the cell-item (0,1) is the header 'Product Description,' while cell-item (3,1) is blank.

To date, there is no known content extraction approach that combines logic rule support to soft-supervise machine learning algorithms in the space of cell-item prediction in semi-structured documents. At least some example embodiments are directed to such content extraction approaches.

B. Technical Challenges

Following is a discussion of various technical challenges that may be addressed, and resolved in whole or in part, by example embodiments. These are presented by way of illustration, and are not intended to limit the scope of the invention in any way. In more detail, example embodiments of the invention may address the general problem of information extraction from unstructured documents. One aspect of organization document processing is the time and effort spent on reading and manually extracting information from documents. Thus, an automatic tool to extract content from documents without, or at least with a minimum of, human intervention may save a significant number of working hours. Additionally, embodiments may enable humans to work better and focus on more critical tasks.

B.1 Limitations of Logic Rule-Based Approaches Due to Layout Variability

Documents may have different pre-defined table layouts, even considering the organization that produced the document. Table layouts may be similarly reused across different organizations. For example, every PO (purchase order) from company A has a layout A, with 3 columns, on the bottom of the page. In contrast, company B may generate documents using the layout A and a layout B, with 6 columns, on the center of the document. In other words, a model to extract information automatically will have a hard time generalizing across different documents since rule-based or template-based approaches are not expected to work for all documents.

In the specific case of identifying cell-items, these issues are prominent, with varying frequency, and aggravated by specific issues. Thus, while it seems generally possible to achieve a reasonable effectiveness using cell-item extraction with rule-based approaches, such approaches cannot possibly account for the majority of cases, limiting the effectiveness of such approaches. For example, documents may have different pre-defined table layouts and also have different words representing the header and content of the table. So, keywords cannot be directly used as anchors to discover the correct column of each word inside the table for all documents.

B.2 Limitations of ML Approaches Due to Challenging Domain Characteristics

The information extraction domain in general is very hard and plagued by issues of content variability and incompleteness. These challenging characteristics include: (1) table layout variability—tables come in many shapes and formats, with varying types of graphical markings and spacings; (2) open-ended word content—it is not possible to know beforehand all the possible words that can be present in a table—further, variability in terminology, typology and graphical representation of words is also a challenge, as it is not trivial to determine line items based on word-contents and their graphical representations in the document, due to the high variability across documents, even documents in the same domain; (3) unlimited number of items in the list—for instance, it is not possible to know the number of rows beforehand and, as such, any automatic method would have to be able to respond to an unlimited number of list items—furthermore, not all list items have the same number of elements, for example, not all rows in tables have values in all columns (see (3,1) in FIG. 1); and, (4) variability in terminology, typology and graphical representation—it is not easy to determine line items based on word-contents and their graphical representations in the document, due to the high variability across documents, even documents that are in the same domain such as purchase orders specific to a particular company.

Thus, even though they strive for generality, machine learning methods tend to obtain imperfect accuracy for the cell-item determination for all word-elements in a document. This means that human intervention is still required even in the presence of automation methods. This is highlighted by the following problem.

B.3 Interpretability of Machine Learning Results

It is noted that partially correct results, as described above, may constitute a good result, insofar as those results may minimize the amount of work a human annotator may need to perform. That is, given such results, a human annotator may only have to fix the cell-item predictions the approach got wrong, instead of annotating all the predictions. However, if interpretability of the machine learning results could be provided, the review work of such human annotators could be targeted towards documents, and/or words within documents, that are most likely to require comprehensive reviews. If this were possible, the amount of human work necessary for practical applications might be significantly reduced, thereby also decreasing the cost of those company operations that require content extraction.

B.4 Limitations Due to Incomplete and Incorrect Knowledge of the Domain

It is noted that the objective of the content extraction task is to encode the most-generalizable set of rules so as to exploit, for example, the graphical elements of an unstructured document, and their relative positioning, to determine the correct cell-item c for each word in a document. FIG. 2 discloses a representation 200 of the universal set of rules U that, when applied in conjunction, would allow for a complete and correct determination of the cell-items for all documents. Particularly, FIG. 2 discloses a representation 200 of the set of universal rules that guide the domain.

The objective of machine learning approaches is also to approximate that universal set of rules—although that is, in practice, very difficult, as noted herein. The universal set of rules may be very closely approximated by human annotators—who are, of course, able to perform the labeling of ground truth for the task of content extraction. In FIG. 2, the set 202 of rules capable of being described by domain experts as H.

Notice that that the set H 202 may contain rules not in U 200, as it may be difficult for domain experts to identify, record, and formalize, a correct set of rules. Further, some rules determined by human annotators may be redundant, for example, or include incorrect generalizations that are inconsistent with rules of the domain. Hence, the set of rules H 202 may be incorrect. Notice that incorrect rules are not necessarily useless—in fact, they may apply correctly to some cases, but cannot be systematically considered as being in error, thus incurring the need for revision by a human.

It may also be difficult for H 202 to be complete, and include all the rules in U 200. Domain experts, which could comprise AI and/or humans, may be able to formalize rules that apply to a majority of cases, but there may be a significant number of rules in the overlap between U 202 and H 200 that are required to reason about all documents in the domain. Furthermore, as new documents, of new layouts are considered, the universal set U 200 may change. To that end, example embodiments may be seen as a way to determine R 204, that is, a set of rules that may be able to be determined a priori, that is, by induction, based on empirical experience, by domain experts (H) are correct and can be used to help guide further human annotation.

C. Concepts Relating to Example Embodiments

Following is a discussion of some fundamental concepts that may relate to example embodiments of the invention. This discussion is not intended to limit the scope of the invention in any way.

C.1 Extraction of Words from Documents

In embodiments, a document may be pre-processed, generating a list of words and the coordinates of their corresponding bounding boxes. This task may be executed via Optical Character Recognition (OCR) if the document is in the form of scanned images, and commercial and open source OCR tools exist today for this purposes, such as Tesseract. Alternatively, a document in digital form, such as the Portable Document Format (PDF), may already contain the required information in the desired format. Open-source programming libraries and frameworks exist that support the extraction of words and graphical elements from such documents. One example of such a framework is 'pdfplumber' for the Python programming language.

C.2 Object Detection with Deep Learning

Machine learning (ML) has been successfully applied in the field of object detection, especially with the advent of Deep Learning (DL) and large-scale image datasets, for example, detecting faces on camera images as used by most commercially available phones when taking pictures. A great deal of the success is due to supervised learning, where a set of known examples is given to a DL model during the training phase. The model can be trained to output detections that are close to the correct ones through adjustment based on one or more error metrics. Once the model has been trained, it may be used for inference, where objects can be detected in images previously unseen by the model.

C.3 Table Detection

Figure 3:
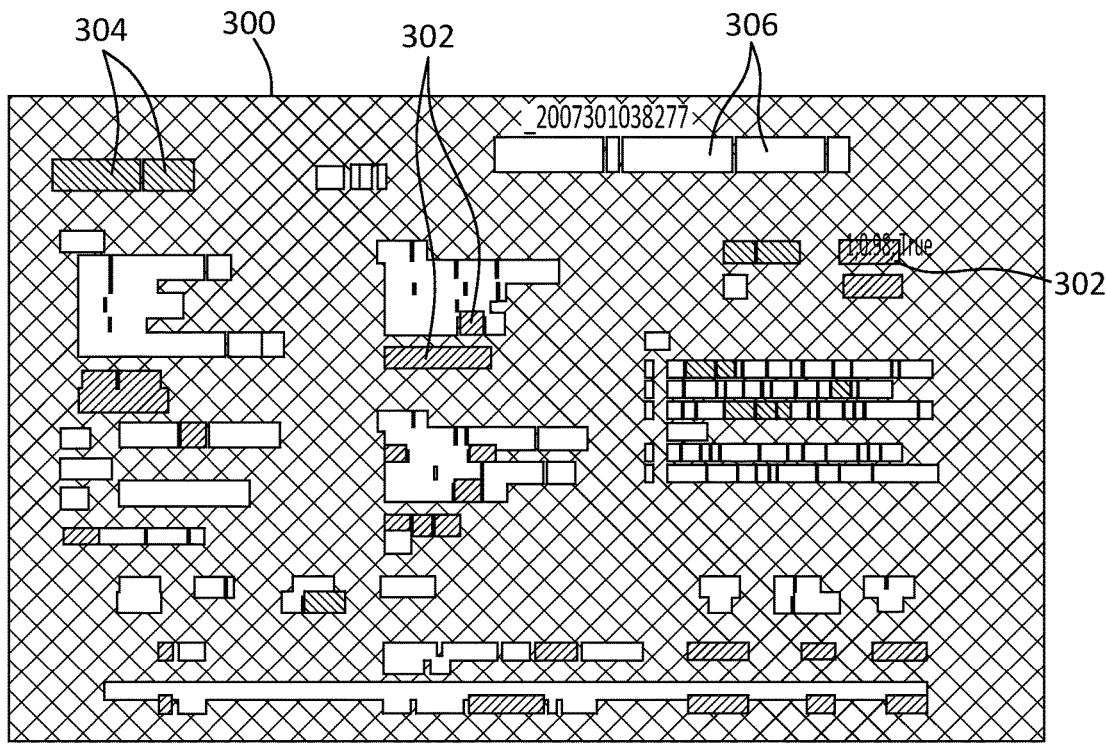
FIG. 3 discloses an example representation of a purchase order document that went through our color-coding process, where the various boxes indicate candidates for an item of interest ("order number"), and keywords associated with the item of interest.

Table detection refers to detecting a table body and a table header on a given document. To this, embodiments may operate to train a computer vision model. In this method, an object detection deep neural network is fed with an image mask where the bounding boxes of keywords associated with an item of interest in the document, such as the "order number" field for example, and candidates for the item of interest itself may be color-coded while the bounding boxes of generic words are painted in white. The idea is that the model may infer the location of the bounding box of the item of interest by learning the geometrical, that is, layout, relationships between keywords and generic words, as illustrated in FIG. 3. Particularly, FIG. 3 discloses an example representation 300 of a purchase order document that has been subjected to a coding process. The boxes 302 indicate candidates for an item of interest ("order number", marked in read on the top-right), the boxes 304 indicate keywords associated with the item of interest, and the bounding boxes 306 indicate generic words.

C.4 Column Item Prediction

C.4.1 Using Graph Neural Networks

In general, a graph neural network (GNN) is a machine learning model that takes as input a graph $\lceil=(N, E)$ represented by a set of nodes, N, connected by edges, E. In a typical GNN implementation, features H associated with the graph nodes at each layer, l, of the network are transformed via a function of the features of the neighboring nodes and edges in the graph in the previous layer.

That is, $h_{i,l+1}=f(h_j,l,e_j,i,l \forall j \in \mathcal{N}(i))$, where $h_{i,l+1}$ are the features of node i at layer l+1, $h_{i,l}$ are the node features of the neighbors of node i at layer l, $e_{j,i,l}$ are the features of all incident edges of node i at layer l, and $\mathcal{N}(i)$ are the neighbors of node i. These successive transformations through multiple network layers generate an embedding of the features of the nodes, which can then be used as input for classification or regression models.

The inventors have proposed a GNN model with special features to solve the problem of identifying column items in tables of purchase order documents of varied layouts. The features may leverage two-dimensional characteristics of the words in the table in order to predict the column index of each word.

Such features, generally referred to as spatial features, may capture the following characteristics: 1. Local density: for every word in the table, the authors counted the number of words surrounding the word inside a pre-defined radius. The intuition was that words in descriptive columns such as 'product description' would be surrounded by more words than numeric columns such as 'quantity' or 'unit price'; 2. Local numericness—for every word in the table, the average proportion of digits in words surrounding the word inside a pre-defined radius was computed. The intuition is that words in numeric columns such as 'quantity' would be essentially composed of digits (numericness close to 1), whereas words in descriptive columns would be essentially composed of letters (numericness close to 0); 3.Word2Vec2D: the authors extended the Word2Vec embedding algorithm to consider words in the horizontal as well as in the vertical direction. In this way, the word embeddings may capture the spatial context of each word in the table. The intuition is that the words spatially surrounding a word in the table provide more contextual information about the use of the word and its synonyms than words in sequential text (original Word2Vec assumption) do.

With continued reference to the aforementioned GNN model developed by the inventors, a document table was represented as a fully-connect graph where words represented the nodes of the graph and the edges represented the connections between words. Such graph was the input for the GNN model training. For each node (i.e., word) of the graph, the features above were concatenated into a vector representation together with a baseline feature that represented the $\{x, y\}$ coordinate of each word inside the table. The $\{dx, dy\}$ distances between a word and a neighbor word, as indicated by edges in the graph, were also as input for the model. The authors conducted several experiments that showed that the proposed spatial features improved the baseline model with only the $\{x, y\}$ coordinates of the words and the $\{dx, dy\}$ distances of the edges.

C.4.2 Using Pre-Assignment Domain Rules

In the '136 Application, the inventors proposed an alternative approach to column-item prediction in which a GNN (with a different set of features) is combined with a rule-based approach to further improve prediction accuracy. The term 'rule-based' approach here refers to a pre-assignment of column items so that a machine learning model adapts the initial guess into a final prediction value—note that these are not related to the logic rules leveraged in the presented approach discussed below.

Figure 4:
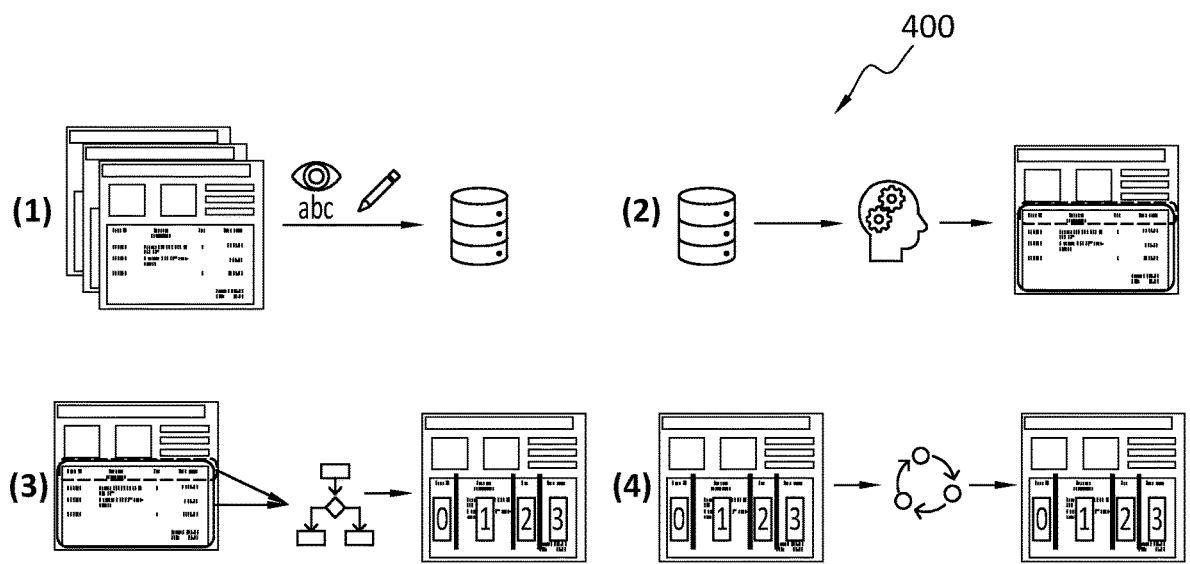
FIG. 4 discloses an overview of operations involved in an example method according to some embodiments.

FIG. 4 discloses an overview of the four main operations involved in the method described in the '136 Application. Particularly, FIG. 4 discloses an overview 400 that may comprise the following operations: (1) document data collection and annotation; (2) training/inference of a computer vision model to detect table body and table header boundaries; (3) application of a tailor-made rule-based algorithm to pre-detect column-items; (4) refinement using a GNN to finally assign a column to each element (word) in the table. The machine learning operations (2) and (4) in FIG. 4 may further comprise each a respective training phase and an inference phase. The '136 Application discloses results of experimental validation of the methods described above on an annotated dataset with 7577 internal purchase order documents.

C.5 Row-Item Extraction

Figure 5:
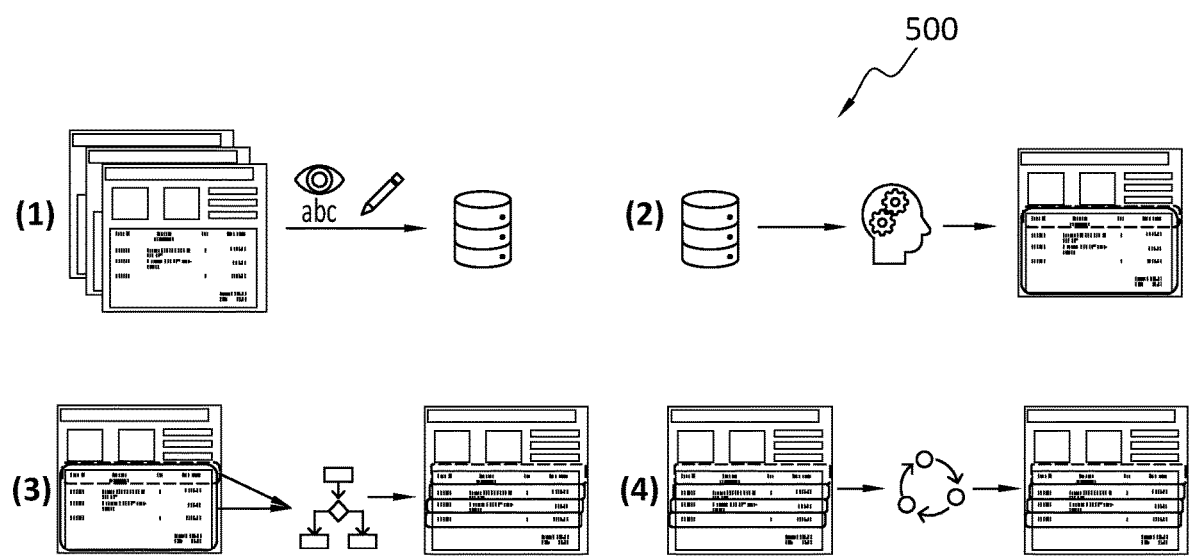
FIG. 5 discloses an overview of operations involved in another example method according to some embodiments.

The inventors have proposed an automatic method for extracting line-items such as table rows from unstructured documents. This automatic method is quite similar to that disclosed in the '136 Application. FIG. 5 discloses an overview 500 of the main operations involved in that method. Particularly, FIG. 5 discloses: (1) document data collection and annotation; (2) training/inference of a computer vision model to detect table and table header boundaries; (3) application of a rule-based algorithm to pre-detect line-items; (4) refinement using a GNN to finally assign a line to each element (word). As in the case of the example of FIG. 4, the operations (2) and (4) may involve machine learning and, hence, have a separate training and inference phase.

D. Aspects of Some Example Embodiments

Example embodiments of the invention are directed to, among other things, an approach that may leverage an existing attribution of cell-item indexes to word-elements in a document and a set of domain-dependent logic rules, also referred to herein simply as 'rules,' to guide human annotation processes. In contrast with previous work by the inventors, referred to herein, embodiments of the invention may not consider domain rules to manage the input to machine learning models. Rather, embodiments may take a fundamentally different approach by post-processing the results, or output, of models, machine learning or otherwise, with respect to the relative support of layout patterns encoded as logic rules.

Embodiments may include a process to apply logic rules, that encodes typical domain patterns, over lists of word-elements extracted from a table of a document. This process may be used to support the semi-automated labeling of documents by identifying interpretable points of concern to human annotators.

D.1 Logic Rules

A logic rule, in at least some embodiments of such a process, may be applied over each word-element in a table within a document. These logic rules may typically relate to: (1) a type check—an example rule might be "words with high proportion of digits can be interpreted as numerical values"; (2) a header association—an example rule might be "words that are product names are associated to a same column as the 'Item description' header"; (3) a combination of both a type check, and a header association—an example rule might be "words whose column relates to a 'Price' header can be interpreted as a numerical value"; and, (4) positional layout rules—example rules might be "all words that satisfy the same type checks as words above it should belong to same the same column," or "a word that is below single-word cells should be a single word in a cell."

Rules such as these may be implemented as a set of predicates in a logic programming language, such as Prolog for example, where each rule may be defined by four clauses: (a) a rule clause, determining the name and arity (# of arguments or operands) of the rule predicate—in the examples below, an embodiment may assume the first argument of each such predicate to be the identifier of a word-item; (b) a description clause, linking a rule to a human-readable interpretation; (c) a precond clause, determining the preconditions that must hold for the rule to be applicable for the argument word-item; and, (d) a check clause, determining clauses that must succeed and/or constraints that must hold for the rule to succeed when the preconditions are met. Example implementations for some of the rules above are set forth in FIG. 6. In particular, FIG. 6 discloses an example implementation 600 of logic rules as Prolog clauses, although logic rules according to example embodiments may be expressed in other ways as well. In some cases, these rules may be determined by domain experts.

D.2 Application of Logic Rules Over Word Items

The processing of the rules may involve the orchestration of calls to the predicates defined as rule clauses. Notice, for example, that the last rule in FIG. 6 contains a recursive precondition check. Within the logic programming paradigm, a call to a rule whose preconditions fail will fail. In the representation above, that is, FIG. 6, the rules may be determined with respect to a precondition and a check. If the precondition does not hold for a given word-item, the rule is not considered. Otherwise, that is, if the precondition does hold for the word, the rule either succeeds (1) or fails (0) regarding that word. It is noted that the rules may operate over sets of cell indices that are either ground truth, or have been predicted by a model. Thus, the rules may not operate over the documents themselves, but over the representations, that is, the cell indices, of where each word in a document belongs in a table of that document.

The application of the rules over a document, more specifically, over cell indices associated with a document, may comprise applying rules R={R1, R2, R3, . . . } over all the word-items W in that document given a cell-item indication c. That indication may originate from labels, such as may have been assigned by human annotators, or from predictions of machine learning models. The patterns that hold and do not hold on each word of that document may thus be obtained. This is shown in FIG. 7.

Figure 7:
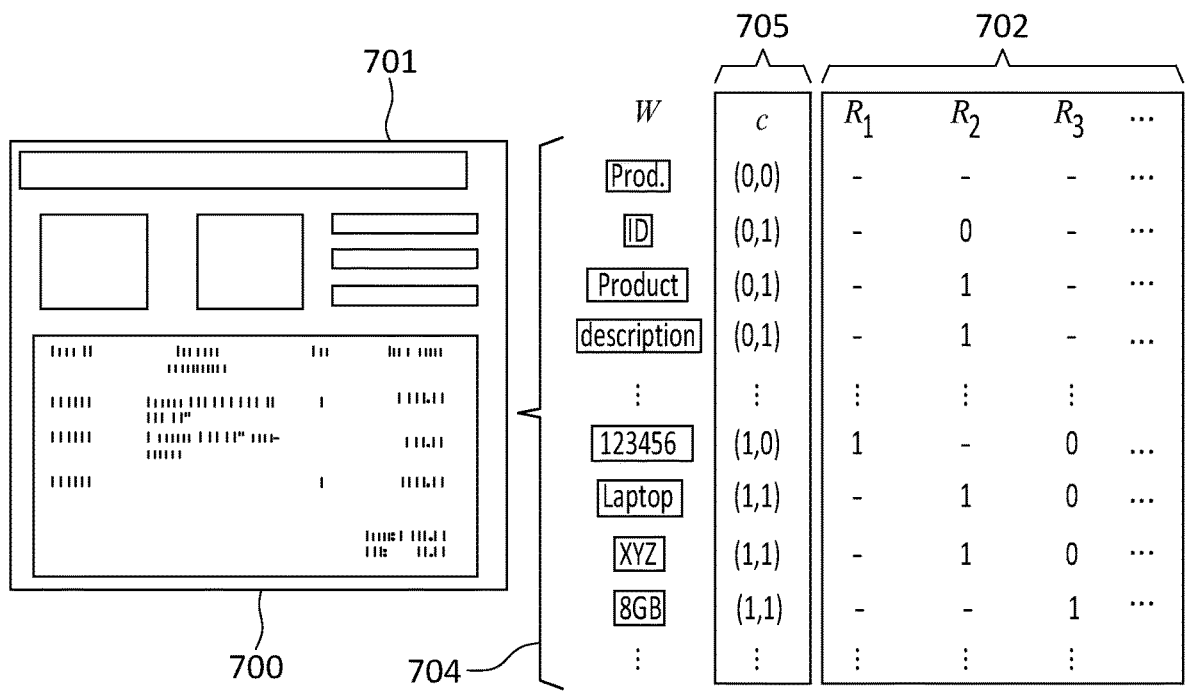
FIG. 7 discloses an example application of logic rules R1, R2, R3, . . . over the word-elements extracted from the document table and their cell-item assignment, obtained using another method, or human annotation.

Particularly, FIG. 7 discloses the application of logic rules R1, R2, R3, . . . 702 over the word-items W 704, extracted from a document table 700 of an unstructured document 701, and their cell-item assignment 705 which may be obtained using human annotation, or some other method, such as a model. In FIG. 7, a dash "-" indicates that the rule 702 is not applicable to that word-item 704, that is, the precondition of the rule does not hold for that word-item 704. A zero "0" indicates that while the precondition does hold for that word-item 704, the check is not satisfied. Conversely, a one "1" indicates that the precondition holds for that word-item 704 and that the checks are satisfied. These cases form the basis of the analysis, implemented by example embodiments, that enable a determination to be made as to which logic rules 702 do, or do not, apply to a document such as the document 701.

D.3 Aggregate Relative Support and Confidence of Logic Rules

After the application of the logic rules, as shown in FIG. 7, embodiments may obtain metrics of the relative support and relative confidence of each rule within each document. In particular, relative support and relative confidence may be computed as follows:
the 'relative support' of a rule may be determined by the proportion of words for which the preconditions of the rule have been met—
formally, rsup=(|w∈R:P(R,w)|/|W|), where P(R, w) denotes the success of clause 'precond' for |W| the rule R, given word w as the first argument; and
the 'relative confidence' of a rule is determined by the proportion of words for which the check succeeded, given that the preconditions of the rule were met. Formally, rconf=(|w∈R:C(R,w)|/|w∈R:P(R,w)|), where C(R, w)
denotes the success of clause 'check' for the rule R, given word w as the first argument.

Figure 8:
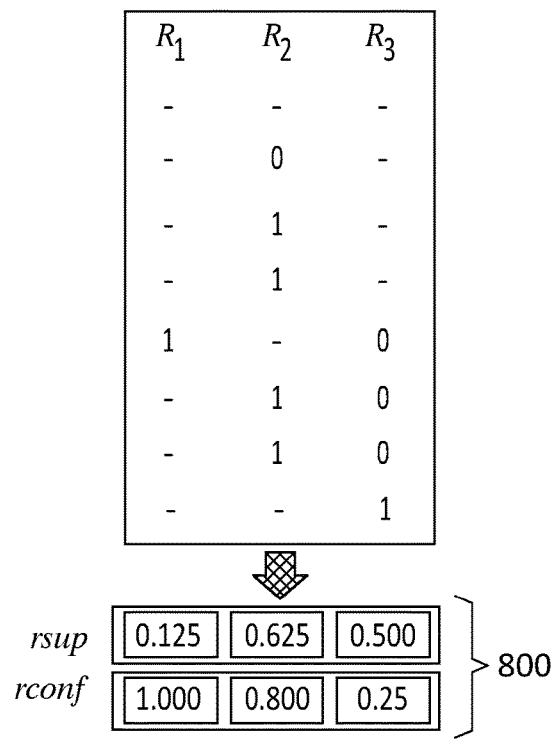
FIG. 8 discloses an example of the computation of relative support metrics for rules over a document.

An example of the metrics computed following an abridged version of the example above is shown in FIG. 8 which shows an example of the computation of relative support metrics for rules over a document. In particular, FIG. 8 discloses the metrics 800 computed over only a few words and a few rules for ease of explanation. In practical applications the number of such rules and words may be much larger.

In more detail, and with continued reference to the example of FIG. 8, it is noted that a "-" denotes that the indicated rule does not apply to a particular word, whereas, if a rule does apply, either a value of "0" (check is not satisfied) or "1" (check is satisfied) is shown. Thus, the 'rconf' value for rule $R_1$ is 1.000, which reflects that of all the words to which that rule applies—only 1 word in the example of FIG. 8—the check is satisfied. Put another way, the rconf value is (total number of "1" values)/(total number of words to which $R_1$ applies), or 1/1=1. The other rconf values may be similarly calculated: 4/5=0.8 for $R_2$, and 1/4=0.25 for $R_3$.

FIG. 8 also discloses the 'rsup' value for various rules. These rsup values may be obtained by taking the ratio of (1) the number of words to which a rule is determined to apply, regardless of whether or not the corresponding check is satisfied (5 in the example of $R_2$) to (2) the total number of words under consideration (8 in this example). Thus, for example, rsup for rule $R_2$ is 5/8, or 0.625. Thus, 'support' may refer to a count of how frequently a rule is applicable to a set of documents, and the words in those documents. Thus, if the support changes its value, that may mean that a rule that was generally applicable to the set of annotated documents (ground truth), is not applicable to the cell-items predicted by the model for the set of annotated documents.

Figure 9:
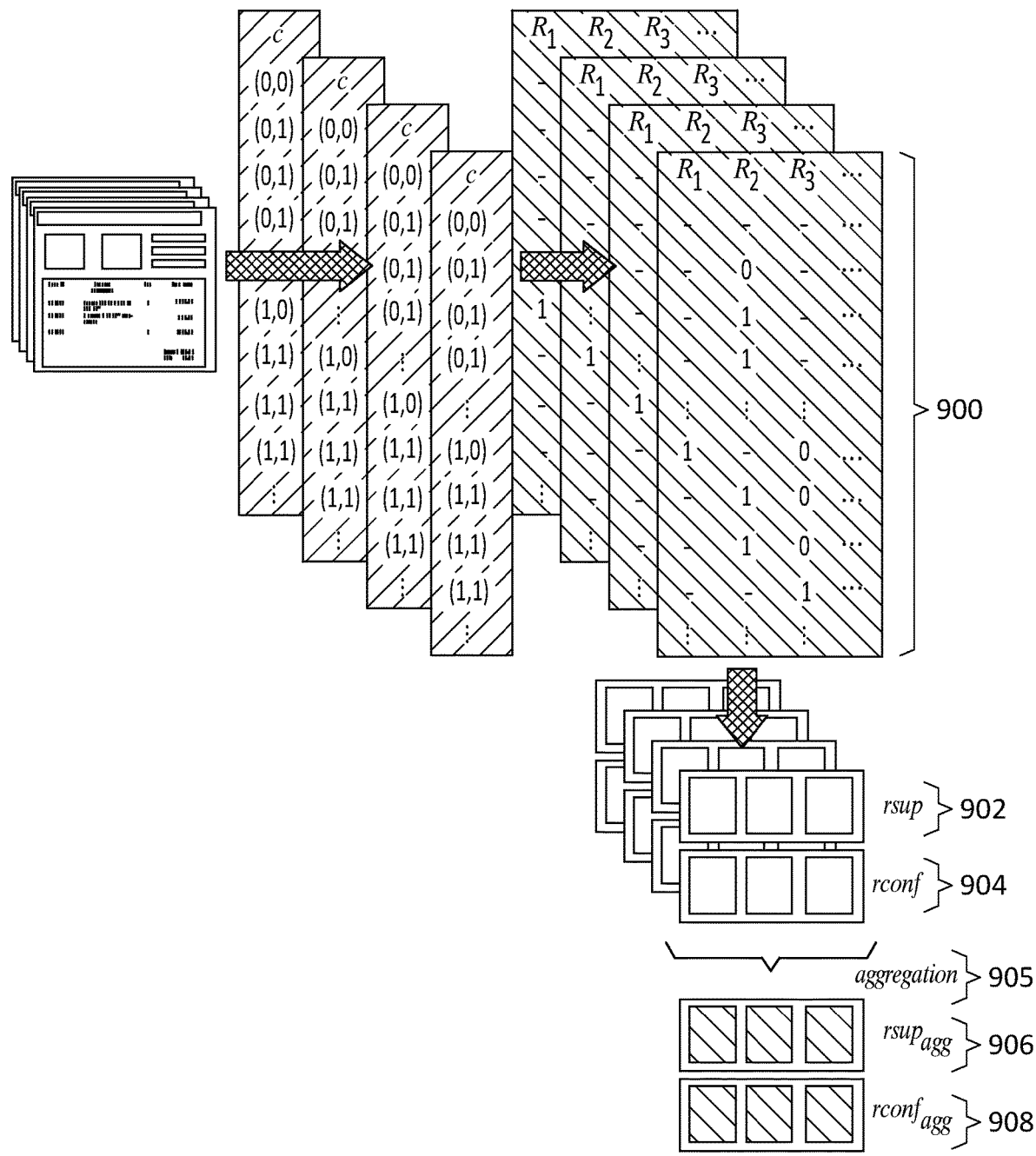
FIG. 9 discloses an aggregation of the metrics of relative support and confidence of sets of documents.

The aggregation of metrics such as rsup and rconf across a large number of annotated documents may provide insight into how frequently a rule is applicable, that is, the relative support, and how frequently the rule is satisfied. One example of such an aggregation is disclosed in FIG. 9. In particular, FIG. 9 discloses, for a set of documents 900, the aggregation 905 of the metrics of relative support 902 and confidence 904. This aggregation process 905 may produce aggregate values rsupagg 906 and rconfagg 908 for the metrics over the set of documents 900. The aggregation 905 may comprise the application of any appropriate statistic, such as the mean and standard deviation, for example. In general, rules with a high average support may be generally more applicable, and rules with high average confidence may be generally more informative.

D.4 Determining Rules of Interest

Embodiments may perform an aggregation process, such as that described above, to a set of documents for which labeled data is available. That is, these are documents for which human annotators have provided a ground truth of the cell-item indications. More specifically, a human annotator has confirmed, for example, that a particular cell value belongs in a particular row and column of a table of a document.

Figure 10:
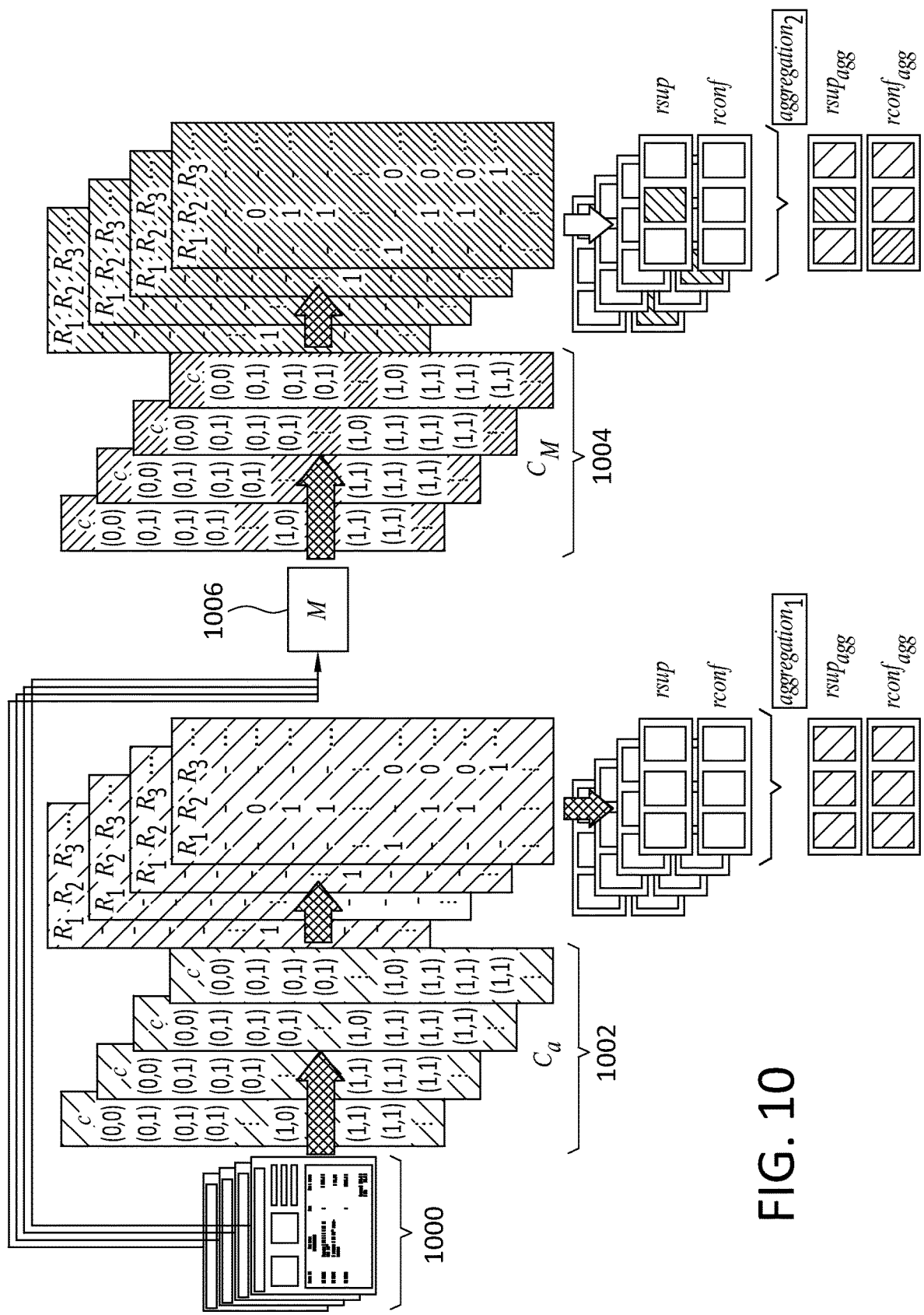
FIG. 10 discloses the obtaining of aggregate metrics of relative support and relative confidence for a same set of documents using annotations ca (left) and the cell-items cM predicted by a model M (right).

In some embodiments, the aggregation process may be performed multiple times. In some particular cases, the aggregation process is performed twice ('aggregation 1' and 'aggregation 2'), once considering the ground-truths ca, and once considering the predicted cell-items of the words in the same documents $c_M$. This is shown in FIG. 10 which discloses, in particular, the obtaining of aggregate metrics of relative support and relative confidence for a common set of documents 1000 using annotations ca 1002 and the cell-items $c_M$ 1004 predicted by a model M 1006. That is, and as noted earlier herein, the aggregation is performed, in the example of FIG. 10, with respect to the output of the model M 1006.

In more detail, FIG. 10 discloses (the on the left side) the set of documents 1000, along with cell items that have been annotated by human labeler. That is, a human person looked at the documents, assigned the roles and columns of the table, which explicitly tells indicate which cell in the table each word in the table belongs to. On the right hand side of FIG. 10, the same set of documents 1000 are input to the model M 1006, or an ensemble of models. In some embodiments, the model M 1006 may comprise any of the disclosed models operable, for example, to detect the boundaries of a table, and to detect a header using some white space information to determine the columns machine learning approach with a graph neural network.

In FIG. 10, differences in the relative support and confidence metrics are highlighted, and differences in the aggregate metrics values are highlighted. Note that the model M 1006 represented in FIG. 10 may be assumed to exist and may comprise an ensemble or combination of the models, examples of which are disclosed elsewhere herein. That is, the scope of the invention is not limited to the use of any particular model, or ensemble of models.

Processes according to example embodiments may enable a comparison of the rules for which the aggregate relative support is the same, but for which there is also a change in confidence when considering the predictions of model M as compared with the outcome based on ground truths. An example of this is disclosed in FIG. 11. Particularly, FIG. 11 discloses a determination of rules of interest $\mathbb{R}1100$, tht is, thosee rules for which the aggregate support is the same, or substantially the same (such as about 50 percent to about 75 percent, or higher), regardless of using annotated (ground truth), or predicted (model generated), cell-items, and also for which the relative confidence changes from the ground truth result to the model result. The rules denoted $c_a$ in FIG. 11 (left side) are rules applied to cell indices of the documents in a document set.

Figure 11:
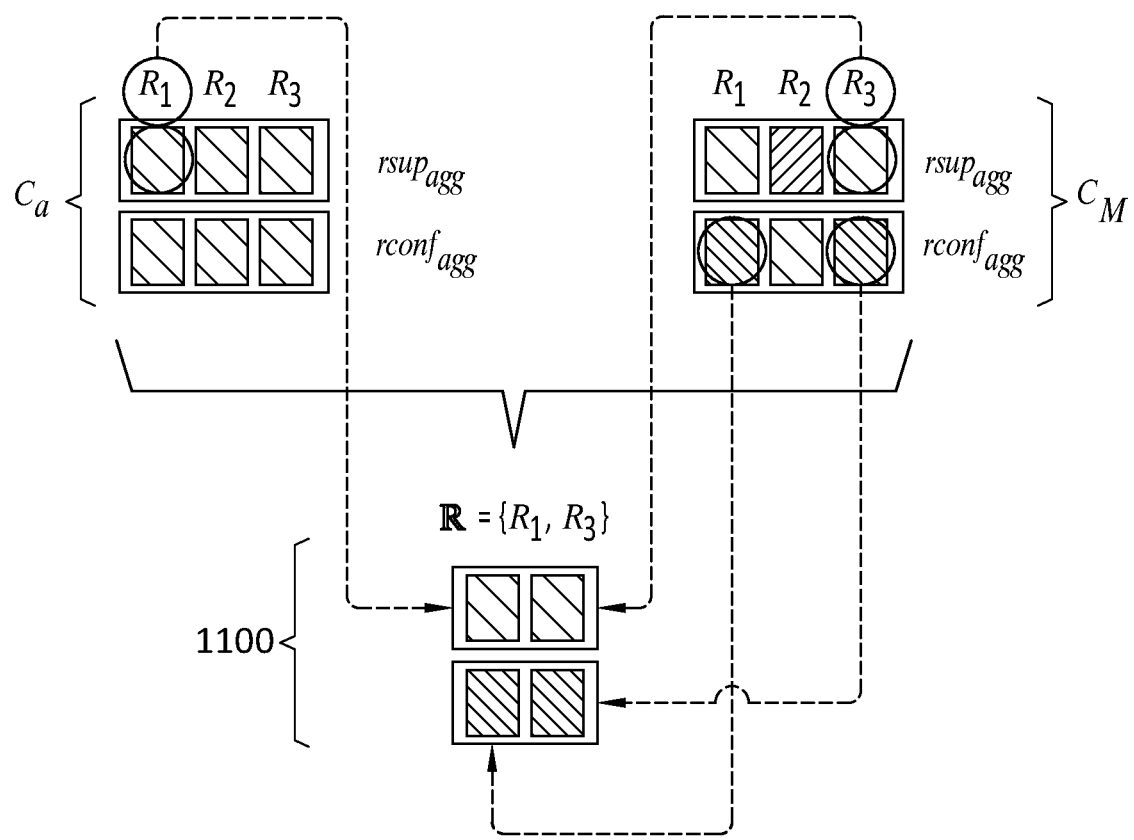
FIG. 11 discloses a determination of rules of interest—those for which the aggregate support is substantially the same regardless of using annotated or predicted cell-items; and for which the relative confidence changes.

As shown in FIG. 11, based on the comparison, the subset $\mathbb{R}1100$ of rules is selected. In this example, only rules $R_1$ and $R_3$ are selected. The aggregate support $rsup_{agg}$ is the same for both rules $R_1$ and $R_3$ (no change whether ground truth or model values applied) while the respective aggregate confidence $rconf_{agg}$ for the rules $R_1$ and $R_3$ has changed (relative to the values obtained based on ground truth).

Note that the example of FIG. 11 is a restricted example, presented for the purposes of illustration, and practical applications may comprise many rules. The rules in $\mathbb{R}1100$ are the rules of interest. Since the difference in relative confidence is caused by differences in the predictions of the cell-items by model M, relative to the values generated based on ground truth, it may be expected that the same rules will be affected by errors by the model M deployed to the content-extraction task.

The determination of which rules are rules of interest based on the comparison between $rsup_{agg}$ (given $c_a$ and $c_M$), and between $rconf_{agg}$ (given $c_a$ and $c_M$) may rely on thresholds and parametrization that must be determined in a domain-dependent fashion. For example, depending on the volume of documents considered, a higher change in support may be acceptable. If a lower volume of documents is considered, or if there is a known homogeneity between the layouts of those documents, only rules for which the aggregate support are substantially the same given ca and cm may be considered. The aggregate relative support and aggregate relative confidence of the rules of interest may be stored in a data structure for decision-making support during the inferencing stage, as discussed below.

D.5 Leveraging Rules of Interest to Support Model M

Figure 12:
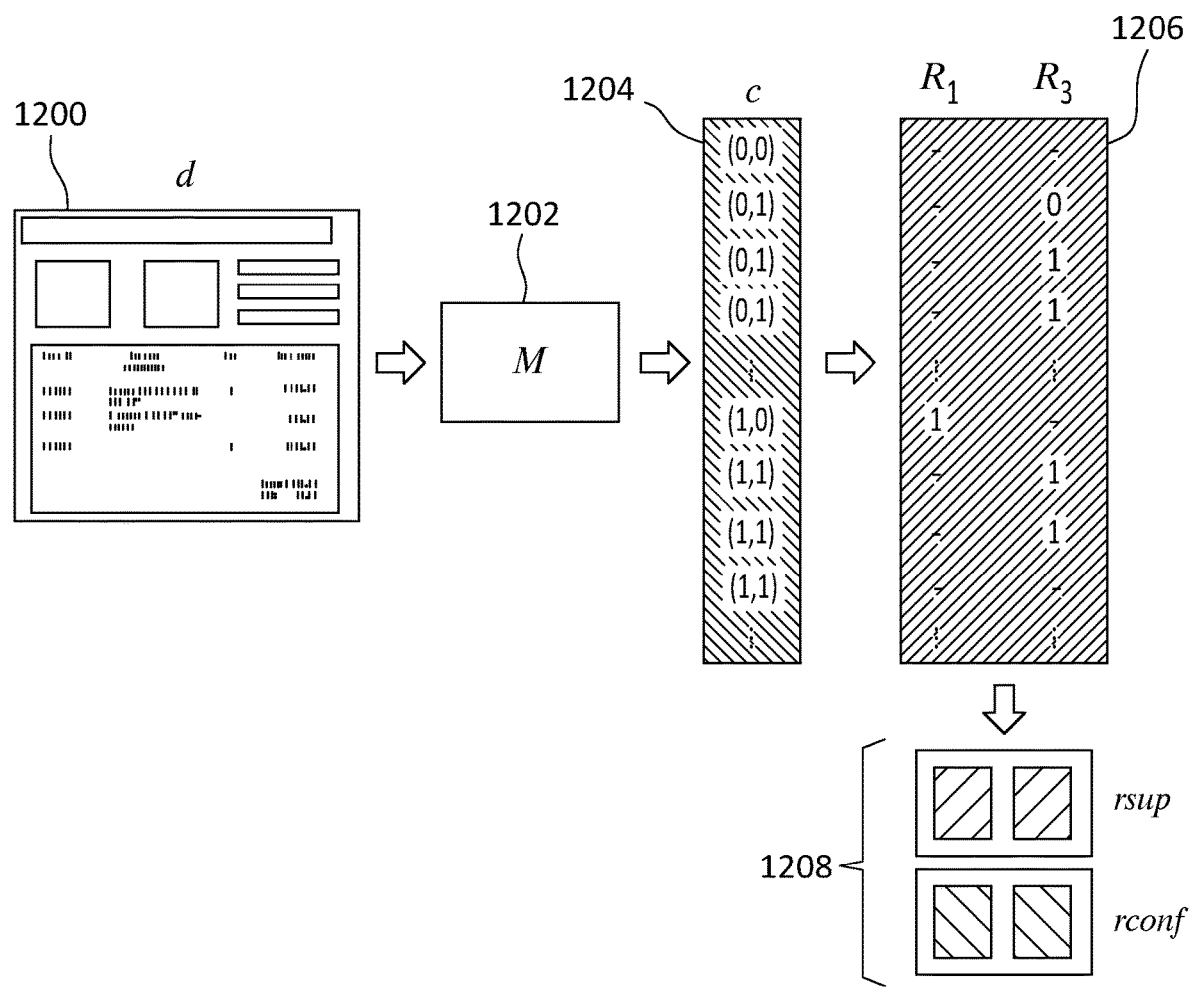
FIG. 12 discloses an example application of rules of interest over the c obtained from the model M during inference.

With reference now to FIG. 12, suppose that there is a new document d 1200 for which no information is available, that is, there is no ground truth information available for document d 1200. The model M 1202 may then have to be run for the document d 1200 in order to obtain a predicted cell item array 1204 for the words in the document d 1200. Then, the rules of interest 1206, such as $R_1$ and $R_3$ in the example of FIG. 11, can be run that have been previously selected based on a comparison of the results of the rules in the ground truth and the predicted model. Application of the rules of interest 1206 may result in the generation of the support and confidence values 1208 for the word(s) in a table of the document d 1200. Then those values 1208 may be compared to the aggregate support in the confidence aggregate confidence that was obtained previously for the same rules in the labeled data set (see FIGS. 10 and 11).

In more detail, given the deployed model M and a new document d 1200 for which no annotation is available, embodiments may perform the inference of model M 1202 to obtain the cell-item prediction c 1204. Embodiments may then perform an additional check, comprising obtaining the relative support and relative confidence for rules of interest given d and c. This is depicted, following the previous example, in FIG. 12. That is, FIG. 12 discloses the application of the rules of interest 1206 over the c 1204 obtained from the model M 1202 during inference. Notice that embodiments may apply only the rules of interest 1206, rather than all the rules. These may comprise a much smaller and restricted set of rules than the original set of formally defined logic rules in the domain. Next, embodiments may then proceed to compare the statistics obtained for the rules of interest for this case to the aggregate support and confidence obtained previously for the same rules. This may enable determinations as to: (1) whether the relative support of the rule changed—which indicates that the rule was expected to be more (or less) generally applicable to words within the document; and (2), if the relative support is similar to the aggregate relative support, whether the confidence changed.

In the latter case, methods according to example embodiments may be capable of providing actionable insight to the human annotators, that is, an indication that the model M 1202 may have wrongly attributed cell-item indexes to words, but also to which words. This may be performed as follows.

First, a message may be composed to be shown to the annotator(s) based on the description clause of the rules. For example, if rule 'assert_product_description' is of interest, and the confidence obtained for d 1200 given c 1204 deviate from the $rconf_{agg}$, a message may be composed for each word for which the rule preconditions hold but the check fails, such as: "Product name 'Latitude' should be associated to the Item Description header." This may provide a more semantically meaningful context to the annotator of where to look for errors. Secondly, the words for which the rule was applicable, but the check failed can be highlighted, in any suitable fashion given the interface of the tools that the human annotator works with.

E. Further Discussion

As will be apparent from this disclosure, example embodiments may possess various useful features and advantages. For example, embodiments may provide a process to leverage a select set of logic rules that encode typical patterns over lists of word-elements extracted from document tables. As another example, the process may be used offline to determine the rules of interest, that is, those rules for which a model M (in-place and deployed for content-extraction) typically affects. Further, the process may then be used online to determine, for a new document, whether any of the rules of interest are indications of mistakes that the model M might have incurred for this instance. Finally, the process may be used to support the semi-automated of labeling of documents by identifying interpretable points of concern to human annotators.

F. Example Methods

Figure 13:
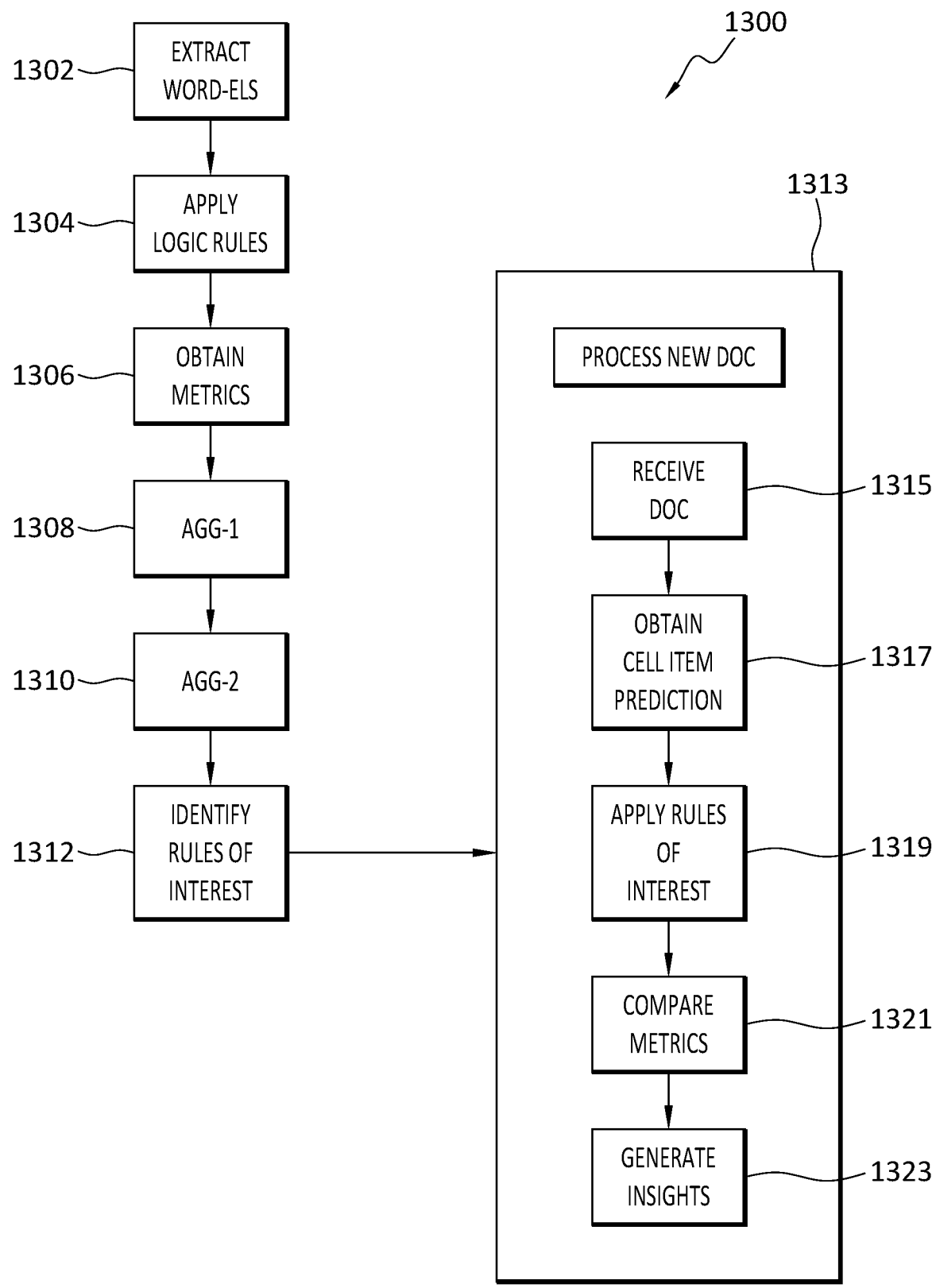
FIG. 13 discloses an example method for content extraction, according to some embodiments.

It is noted with respect to the disclosed methods, including the example method of FIG. 13, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 13, an example method 1300 may begin with the extraction 1302 of word-elements from an unstructured document so as to determine a cell-item assignment for each of the word-elements. Logic rules may then be applied 1304, on a cell-item basis, to the extracted word-elements. This application of logic rules 1304 may identify, for each word-element, the rule(s) that apply to that word-element.

After the applicable rules have been identified, metrics may be obtained 1306 that reflect, for each word-element, the applicability of a rule (relative support), and the frequency with which an applicable rule is satisfied (relative confidence). With the metrics in hand, a first aggregation process 1308 may be performed that includes aggregating the metrics across a group of unstructured, and annotated, documents, and another aggregation process 1310 may be performed that includes aggregating the metrics with respect to a model-generated cell item array that was created based on the group of annotated documents. The aggregation processes 1308 and 1310 may result in the generation of respective sets of aggregate metrics.

By comparing the two sets of aggregate metrics—one for the ground truth cell-item array and one for the model-generated cell item array, one or more rules of interest 1312 may be identified. At this point, the method 1300 is prepared to evaluate a new document, for which no annotation is available.

The processing 1313 of a new document may begin with the receipt 1315 of the document. At 1317, a model may be used to determine a cell-item prediction array for the new document. The rules of interest that were previously determined 1312 may then be applied 1319 to the model-determined cell-item prediction array. At 1321, metrics may be obtained for the application 1319 of the rules of interest, and those metrics may be compared with metrics previously obtained based on a ground truth cell-item array. Based on the outcome of the comparing 1321 of the sets of metrics, one or more insights may be generated 1323 that may be transmitted to a human for consideration and possible action. The insights may indicate, for example, whether, and where, any errors may have occurred with respect to the assignment of a word-element to a particular cell-item.

G. Further Example Embodiments

Following are some further example embodiments of the invention. These are presented only by way of example and are not intended to limit the scope of the invention in any way.

Embodiment 1. A method, comprising: extracting word-elements from an annotated document, and each word element corresponds to a respective element of a ground truth cell-item array; applying logic rules, on a cell-item basis, to the extracted word-elements so that the applicability, or not, of each logic rule to each element of the ground truth cell-item array is determined; based on the applying of the logic rules, obtaining metrics that indicate, for each word-element of the annotated document, the applicability of the logic rules, and the frequency with which applicable logic rules are satisfied; performing a first aggregation process comprising aggregating the metrics across a group of unstructured, and annotated, documents; performing a second aggregation process comprising aggregating the metrics with respect to a model-generated cell item array that was created based on the group of annotated documents; and comparing respective outcomes of the first aggregation process and the second aggregation process so as to identify logic rules of interest.

Embodiment 2. The method as recited in embodiment 1, wherein the annotated document, and documents in the group of annotated documents, are unstructured documents.

Embodiment 3. The method as recited in any of embodiments 1-2, wherein the first aggregation process results in generation of a first set of aggregated metrics, and the second aggregation process results in a second set of aggregated metrics.

Embodiment 4. The method as recited in any of embodiments 1-3, wherein the rules of interest have a same aggregate relative support $rsupp_{agg}$ as each Embodiment 5. The method as recited in any of embodiments 1-4, wherein the rules of interest have a different respective relative confidence $rconf_{agg}$.

Embodiment 6. The method as recited in any of embodiments 1-5, wherein the annotated document comprises annotations added by a human.

Embodiment 7. The method as recited in any of embodiments 1-6, wherein one of the metrics is a relative support metric that is a function of (1) a number of cell-array elements, and (2) a number of logic rules applicable to the cell-array elements.

Embodiment 8. The method as recited in any of embodiments 1-7, wherein one of the metrics is a relative confidence metric that is a function of (1) a number of logic rules applicable to the cell-array elements, and (2) a number of the applicable logic rules that are satisfied.

Embodiment 9. The method as recited in any of embodiments 1-9, wherein the model is a machine learning model.

Embodiment 10. The method as recited in any of embodiments 1-9, further comprising: receiving an unannotated document; using a machine learning model to obtain a cell-item prediction for word-elements extracted from the unannotated document; applying the rules of interest to the word-elements on a cell-item basis, and obtaining associated metrics; comparing the associated metrics with the metrics obtained for the annotated document; and based on the comparing, generating an insight that indicates, to a human, where an error may have occurred with respect to the assignment of one of the word elements of the unannotated document to a particular cell-item in the cell-item prediction that was obtained for the unannotated document.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

H. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 14:
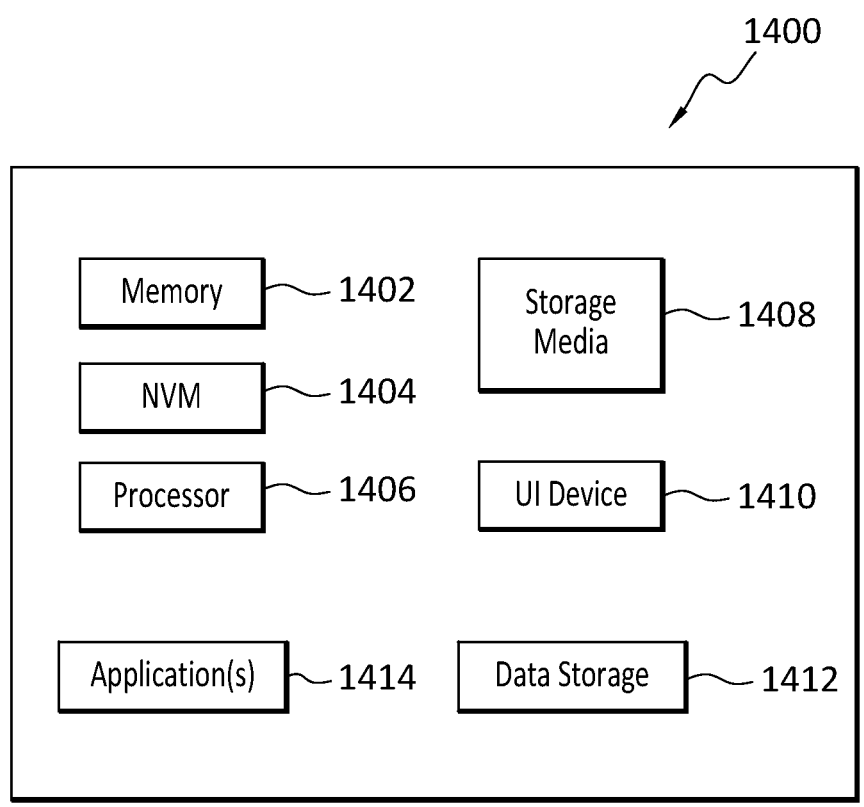
FIG. 14 discloses an example computing entity operable to perform any of the claimed methods, processes, and operations.

With reference briefly now to FIG. 14, any one or more of the entities disclosed, or implied, by FIGS. 1-13 and/or elsewhere herein, may take the form of, or include, or be implemented on, or hosted by, a physical computing device, one example of which is denoted at 1400. As well, where any of the aforementioned elements comprise or consist of a virtual machine (VM), that VM may constitute a virtualization of any combination of the physical components disclosed in FIG. 14.

In the example of FIG. 14, the physical computing device 1400 includes a memory 1402 which may include one, some, or all, of random access memory (RAM), non-volatile memory (NVM) 1404 such as NVRAM for example, read-only memory (ROM), and persistent memory, one or more hardware processors 1406, non-transitory storage media 1408, UI (user interface) device 1410, and data storage 1412. One or more of the memory components 1402 of the physical computing device 1400 may take the form of solid state device (SSD) storage. As well, one or more applications 1414 may be provided that comprise instructions executable by one or more hardware processors 1406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
extracting word-elements from an annotated document, wherein each word element corresponds to a respective element of a ground truth cell-item array;
applying logic rules, on a cell-item basis, to the extracted word-elements so that the applicability, or not, of each logic rule to each element of the ground truth cell-item array is determined;
based on the applying of the logic rules, obtaining metrics that include a first metric indicating applicability of the logic rules to each word-element of the annotated document, and a second metric indicating, when a logic rule is applicable, a probability that the logic rule is successfully satisfied by the extracted word-elements;
performing a first aggregation process comprising aggregating the metrics across a group of unstructured, and annotated, documents;
performing a second aggregation process comprising aggregating the metrics with respect to a model-generated cell item array that was created based on the group of annotated documents;
comparing respective outcomes of the first aggregation process and the second aggregation process so as to identify logic rules of interest; and
based on the comparing, selecting a subset of the logic rules of which metrics are within a threshold from each other.

2. The method as recited in claim 1, wherein the annotated document, and documents in the group of annotated documents, are unstructured documents.

3. The method as recited in claim 1, wherein the first aggregation process results in generation of a first set of aggregated metrics, and the second aggregation process results in a second set of aggregated metrics.

4. The method as recited in claim 1, wherein the first metric is an aggregate relative support $rsupp_{agg}$.

5. The method as recited in claim 1, wherein the second metric is a relative confidence $rconf_{agg}$.

6. The method as recited in claim 1, wherein the annotated document comprises annotations added by a human.

7. The method as recited in claim 1, wherein the first metric is a relative support metric that is a function of (1) a number of cell-array elements, and (2) a number of logic rules applicable to the cell-array elements.

8. The method as recited in claim 1, wherein the second metric is a relative confidence metric that is a function of (1) a number of logic rules applicable to the cell-array elements, and (2) a number of the applicable logic rules that are satisfied.

9. The method as recited in claim 1, wherein the model is a machine learning model.

10. The method as recited in claim 1, further comprising:
receiving an unannotated document;
using a machine learning model to obtain a cell-item prediction for word-elements extracted from the unannotated document;
applying the rules of interest to the word-elements on a cell-item basis, and obtaining associated metrics;
comparing the associated metrics with the metrics obtained for the annotated document; and
based on the comparing, generating an insight that indicates, to a human, where an error may have occurred with respect to the assignment of one of the word elements of the unannotated document to a particular cell-item in the cell-item prediction that was obtained for the unannotated document.

11. A non-transitory storage medium having stored therein instructions that are executable by one or more hardware processors to perform operations comprising:
extracting word-elements from an annotated document, and each word element corresponds to a respective element of a ground truth cell-item array;
applying logic rules, on a cell-item basis, to the extracted word-elements so that the applicability, or not, of each logic rule to each element of the ground truth cell-item array is determined;
based on the applying of the logic rules, obtaining metrics that include a first metric indicating applicability of the logic rules to each word-element of the annotated document, and a second metric indicating, when a logic rule is applicable, a probability that the logic rule is successfully satisfied by the extracted word-elements;
performing a first aggregation process comprising aggregating the metrics across a group of unstructured, and annotated, documents;
performing a second aggregation process comprising aggregating the metrics with respect to a model-generated cell item array that was created based on the group of annotated documents;
comparing respective outcomes of the first aggregation process and the second aggregation process so as to identify logic rules of interest; and
based on the comparing, selecting a subset of the logic rules of which metrics are within a threshold from each other.

12. The non-transitory storage medium as recited in claim 11, wherein the annotated document, and documents in the group of annotated documents, are unstructured documents.

13. The non-transitory storage medium as recited in claim 11, wherein the first aggregation process results in generation of a first set of aggregated metrics, and the second aggregation process results in a second set of aggregated metrics.

14. The non-transitory storage medium as recited in claim 11, wherein the first metric is an aggregate relative support $rsupp_{agg}$ as each other.

15. The non-transitory storage medium as recited in claim 11, wherein the second metric is a relative confidence $rconf_{agg}$.

16. The non-transitory storage medium as recited in claim 11, wherein the annotated document comprises annotations added by a human.

17. The non-transitory storage medium as recited in claim 11, wherein the first metric is a relative support metric that is a function of (1) a number of cell-array elements, and (2) a number of logic rules applicable to the cell-array elements.

18. The non-transitory storage medium as recited in claim 11, wherein the second metric is a relative confidence metric that is a function of (1) a number of logic rules applicable to the cell-array elements, and (2) a number of the applicable logic rules that are satisfied.

19. The non-transitory storage medium as recited in claim 11, wherein the model is a machine learning model.

20. The non-transitory storage medium as recited in claim 11, further comprising:
receiving an unannotated document;
using a machine learning model to obtain a cell-item prediction for word-elements extracted from the unannotated document;
applying the rules of interest to the word-elements on a cell-item basis, and obtaining associated metrics;
comparing the associated metrics with the metrics obtained for the annotated document; and based on the comparing, generating an insight that indicates, to a human, where an error may have occurred with respect to the assignment of one of the word elements of the unannotated document to a particular cell-item in the cell-item prediction that was obtained for the unannotated document.

\* \* \* \* \*